United States Patent [19]

Schwarz

[11] Patent Number: 4,465,317
[45] Date of Patent: Aug. 14, 1984

[54] MECHANISM FOR ADJUSTING A LUMBAR SUPPORT OF A BACK OF A SEAT OR THE LIKE

[76] Inventor: Johann Schwarz, Neusser Strasse 731, D-5000 Köln 60, Fed. Rep. of Germany

[21] Appl. No.: 306,911
[22] PCT Filed: Jan. 22, 1981
[86] PCT No.: PCT/EP81/00006
§ 371 Date: Sep. 25, 1981
§ 102(e) Date: Sep. 25, 1981
[87] PCT Pub. No.: WO81/02093
PCT Pub. Date: Aug. 6, 1981

[30] Foreign Application Priority Data

Jan. 26, 1980 [DE] Fed. Rep. of Germany ....... 3002827
Jan. 17, 1981 [DE] Fed. Rep. of Germany ....... 3101327

[51] Int. Cl.³ .............................................. A47C 3/00
[52] U.S. Cl. ...................................................... 297/284
[58] Field of Search ................................. 297/284, 410

[56] References Cited

U.S. PATENT DOCUMENTS

| | | | |
|---|---|---|---|
| 2,991,124 | 7/1961 | Schwarz | 297/284 |
| 3,106,423 | 10/1963 | Schwarz | 297/284 |
| 3,542,428 | 11/1970 | Colucci | 297/410 |
| 3,890,000 | 6/1975 | Easley | 297/284 |
| 3,948,558 | 4/1976 | Obermeier et al. | 297/284 |
| 3,973,797 | 8/1976 | Obermeier et al. | 297/284 |
| 4,019,777 | 4/1977 | Hayashi | 297/284 |

FOREIGN PATENT DOCUMENTS 1229947 4/1971 United Kingdom ............... 297/410

Primary Examiner—William E. Lyddane
Assistant Examiner—Mark W. Binder
Attorney, Agent, or Firm—John C. Smith, Jr.

[57] ABSTRACT

The mechanism for adjusting a lumbar support of a back of an office seat, motor vehicle seat or the like, with a plate-like moulding (4) adjustable perpendicularly to the plane of the seat back serves to make the sitter occupy an anatomically correct posture, the moulding (4) supporting the sitter's back. The moulding (4) is adjusted by a spring (5) on which the moulding is disposed and is adjustable transversely by a manual control element. Moulding (4) can also be moved vertically with respect to frame (3). Spring (5) with moulding (4) is adjusted by a shaft (19) mounted for movement with its axis parallel to the plane of the seat back. Shaft (19) can be directly or indirectly coupled by transmission elements (18, 17) to a tapped collar (13) or a toothed rack (25). An indicator mechanism (40, 40a) may be provided to indicate the position of the moulding (4) at any time, a scale plate (41) being connected to the collar (13) and the pointer (42) being connected to a threaded pin.

16 Claims, 10 Drawing Figures

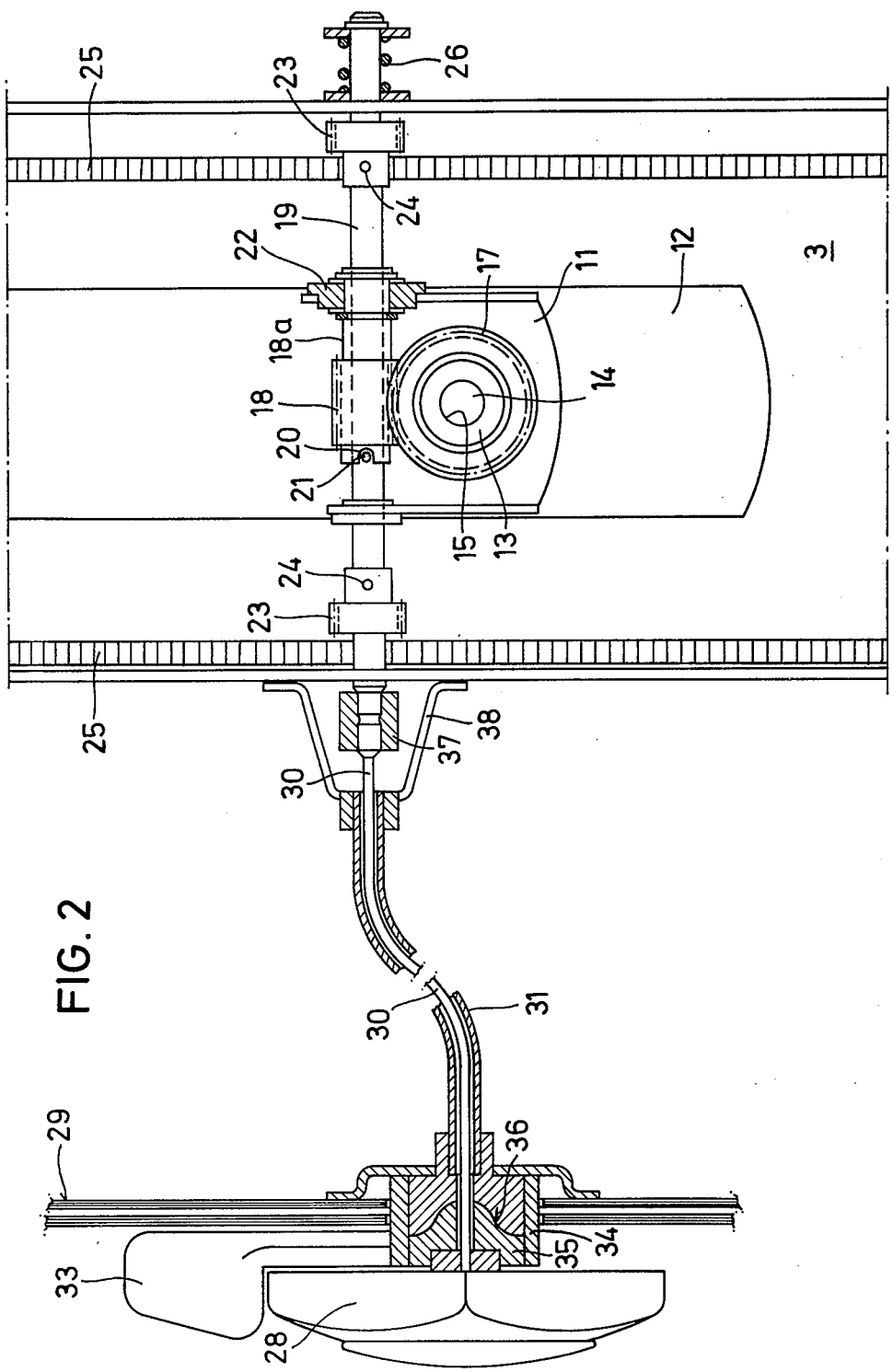

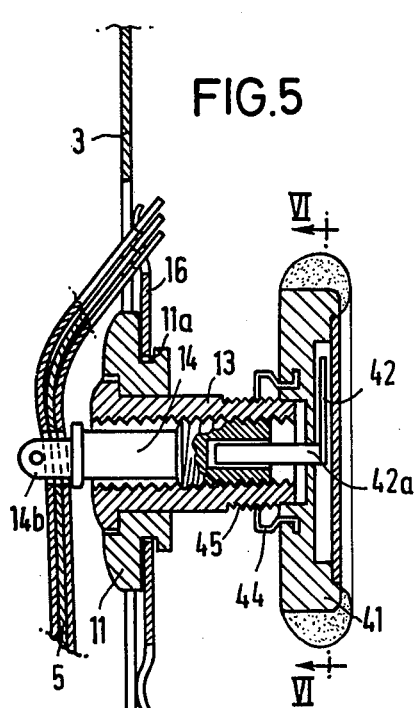
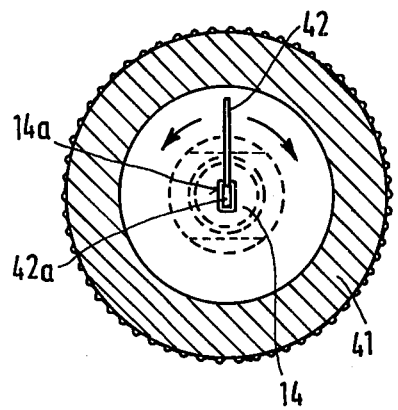
FIG.5
FIG.6
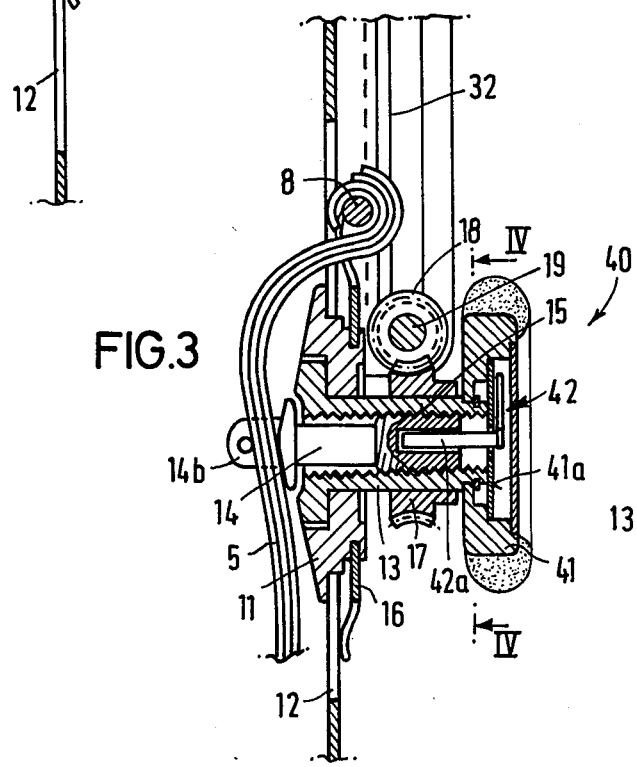
FIG.3
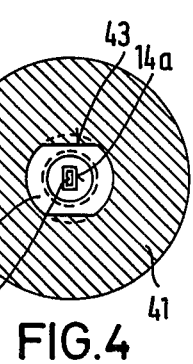
FIG.4

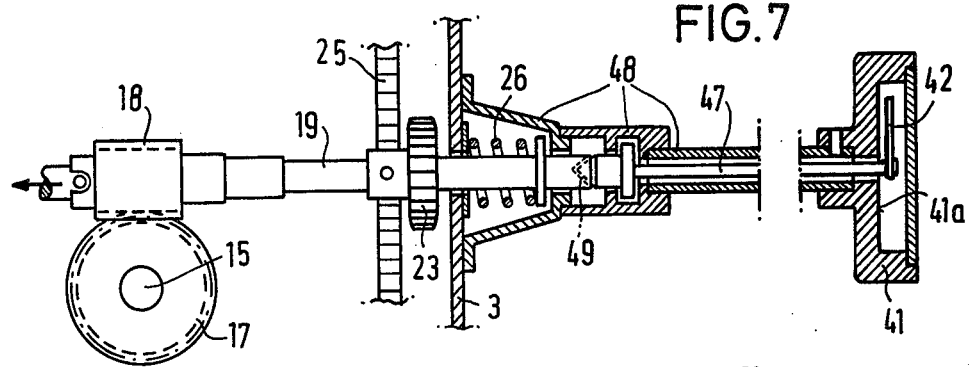
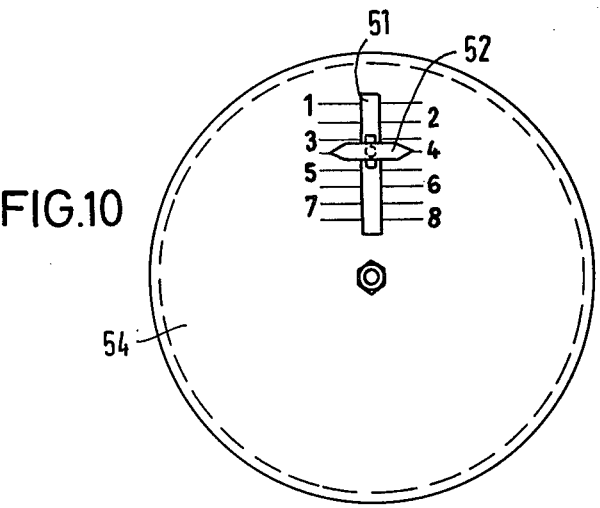
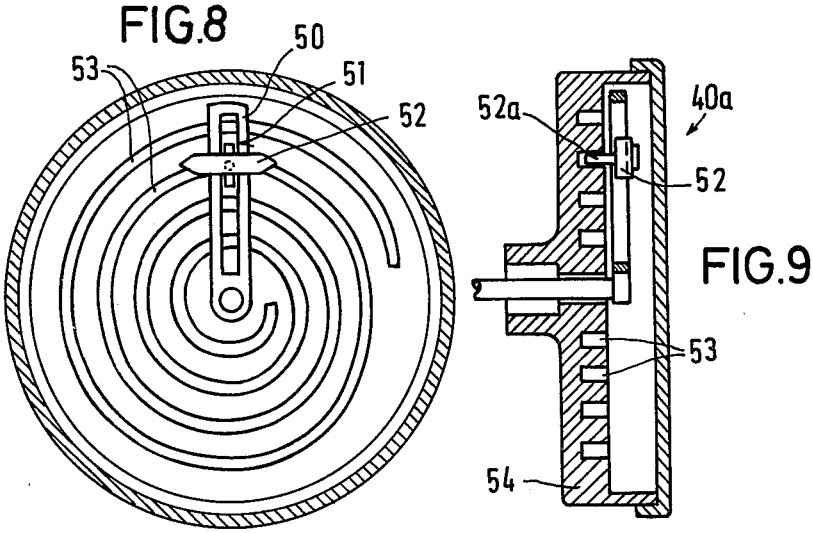

MECHANISM FOR ADJUSTING A LUMBAR SUPPORT OF A BACK OF A SEAT OR THE LIKE

The invention relates to a mechanism for adjusting a lumbar support of a seat or armchair or the like, more particularly office seats, motor vehicle seats or the like, a plate-like moulding which is secured pivotally to a spring being adjustable perpendicularly to the plane of the seat back and vertically.

German patent specification No. 1 404 666 discloses seats which have anadjustable lumbar support and in which the spring is adjustable by means of a screwthreaded pin and a manual grip or hand wheel or similar device and is movable in a slot in a frame, the hand wheel co-rotating with a tapped collar which meshes with the pin and being adapted for movement axially thereof. The hand wheel is pressed in to engage with the collar so that the mechanism can be adjusted vertically on the seat back. With the hand wheel in its withdrawn position, the spring can be adjusted perpendicularly to the plane of the seat back. In the known mechanism the lumbar support must be adjusted directly by the adjusting mechanism and the movable hand wheel must project from the outside back of the seat in order to be actuated. Also, the seat back must be formed with a slot, so that there is a risk of dirt entering the adjusting mechanism. The same is also over elaborate.

It is the object of the invention to provide an adjusting mechanism of the kind initially described herein, the spring being adjustable transversely of the seat back by means of a screwthreaded pin meshing with a tapped collar and of a manual control element, the spring being movable in a slot in a frame, of a kind such that the manual control element for adjusting the moulding can be positioned anywhere on the seat back and the outside back of the seat is free from interruptions. In the mechanism in accordance with the invention, a shaft mounted for movement with its axis parallel to the plane of the seat back is provided and, by way of transmission elements, can be coupled directly or indirectly with the tapped collar of the screwthreaded pin or with a toothed rack which extends perpendicularly to the frame. Advantageously, the shaft is connected to a hand wheel; a flexible actuating element, such as a Bowden cable or the like, can be disposed between the shaft and the hand wheel.

The manual control element for the various forms of operation of the mechanism can then be disposed anywhere on the seat back, advantageously on the side surface thereof. Since the shaft extends parallel to the plane of the seat back, the mechanism is very flat and can therefore be concealed readily on the outside back of the seat. There are no more projecting and visible parts, so that there is less risk of injury in accidents. Also, there are no slots or apertures in the seat outside back, so that there is no risk of dirt entering the mechanism. The mechanism is easy to operate.

In accordance with another feature of the invention, the tapped collar preferably takes the form of a worm wheel with which a worm loosely mounted on the shaft can mesh. The shaft can be locked to the worm by means of a pin or the like. The use of a worm and worm wheel drive ensures that the transmission is self-locking, and so there is good location of every position of adjustment. The height can be adjusted whenever required just by releasing the pin of the shaft from the worm.

To adjust the moulding vertically, the shaft has at least one corotating gear which co-operated with the rack, the gear co-operating with the rack only when the shaft has been moved axially, so that operation of a single hand wheel cannot alter the adjustment of the moulding perpendicularly to the plane of the seat back. Advantageously, the movable shaft is spring-loaded axially so that one form of adjustment—i.e., of the height of the moulding relatively to the plane of the back of the seat—by means of the hand wheel is always available. The shaft can be moved readily by some such means as an adjustable cam.

In accordance with the invention, the pivot carrying the spring engages behind the guide of the frame. This feature provides simple and reliable mounting of the spring carrying the moulding. Conveniently, the moulding is formed with a number of zones for a pivoted connection of the spring, so that the moulding can be arranged at different heights relatively to the spring. The manual control for turning the shaft can take the form of a click-stop device.

The invention will be described hereinafter with reference to an embodiment shown in the drawings wherein:

FIG. 1 is a diagrammatic partly sectioned view in side elevation of an embodiment of the adjusting mechanism in accordance with the invention as used in a pivoted seat back for a motor vehicle or the like;

FIG. 2 is a diagrammatic view, looking in the direction of an arrow II in FIG. 1, of the adjusting mechanism with the manual control elements;

FIGS. 3–10 show indicating devices for use with the adjusting mechanism described;

FIG. 3 is a view in longitudinal section of an embodiment of the indicating device on the back of the adjusting mechanism;

FIG. 4 is a section on the line IV—IV of FIG. 3;

FIGS. 5 and 6 are views in longitudinal section and in section on the line VI—VI of FIG. 5 showing the arrangement of the indicating mechanism when there is provision for direct operation thereof manually;

FIG. 7 is a diagrammatic view in section showing the indicating device arranged at a distance from the adjusting mechanism, and FIGS. 8–10 are diagrammatic views, in side elevation, section and plan respectively, of another embodiment of the indicating mechanism.

Figure 1:
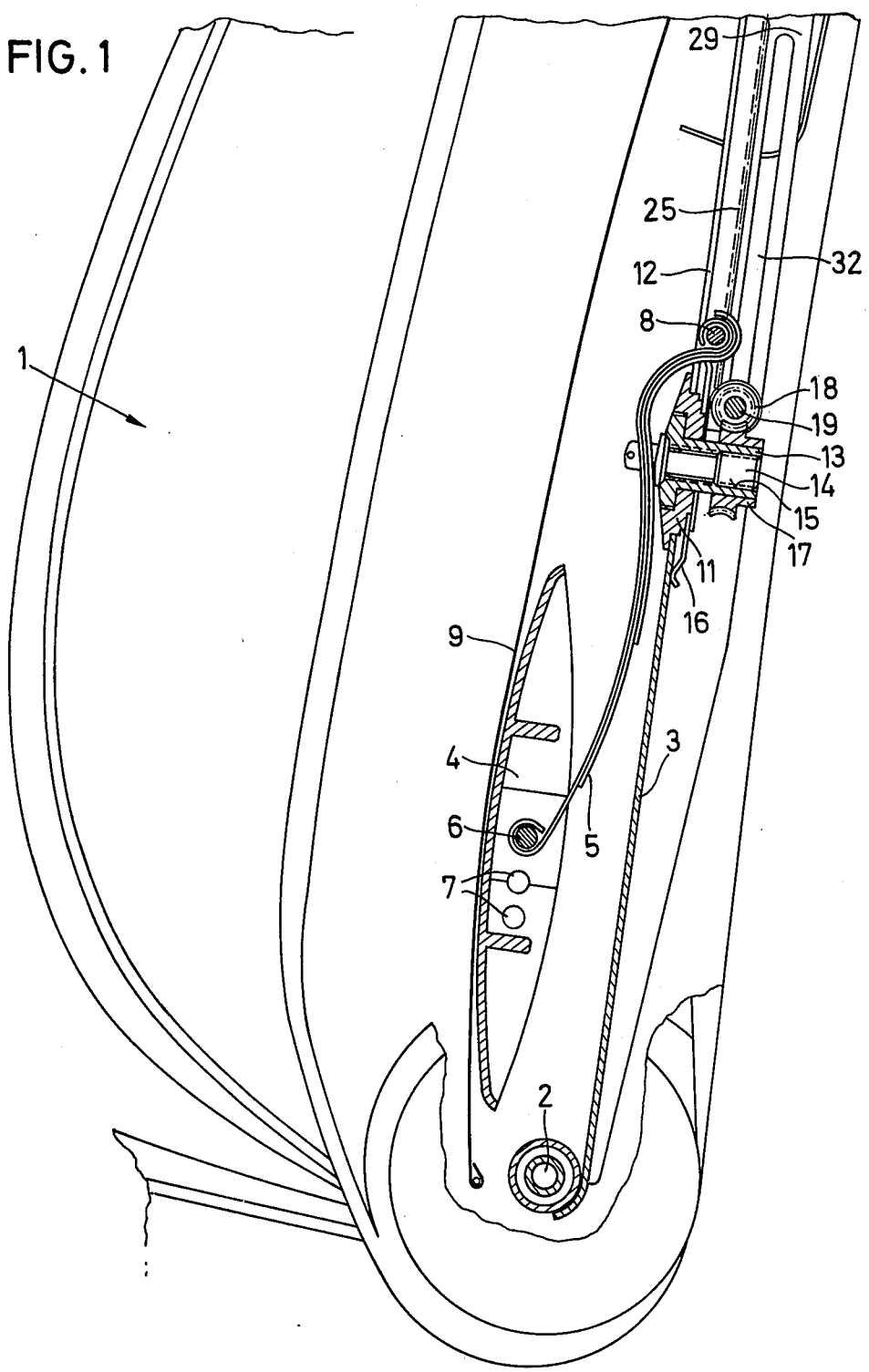

A seat back 1, which can be mounted for pivoting around a transverse pivot 2, has on the back a frame 3 on which a moulding 4 serving as lumbar support is disposed for adjustment vertically and transversely of the vertical direction. Moulding 4 is carried by a spring 5 which is connected by a pivot pin 6 to moulding 4. The pin 6 can be changed round into other bores 7 to vary the height at which the moulding 4 is pivoted to the spring 5. The same is pivotally connected at its top end to a pivot 8 which engages behind the guide of the frame 3. Guide strips or wires 9 can be disposed on the front of the moulding 4 to limit its deflection as a support plate.

A disc 11 mounted for movement in a slot 12 in frame 3 receives a tapped collar 13 in which a pin 14 engages by way of a screwthreaded part 15. Pin 15 so engages at the outer end with spring 5 that axial adjustment of pin 14 by way of collar 13 keeps the spring 5 in a relatively pivoted-out position. Disc 11 is connected to one or more spring strips 16 which engage with frame 3 and co-operate with click or catch zones thereon.

A worm wheel 17 corotates with collar 13 and meshes with a worm 18 loosely mounted on a shaft 19. The same has radial pins 20 which can engage in open grooves or slots 21 in worm 18. Shank 18a of worm 18 is non-movably mounted in a bearing 22. Gears are so secured, e.g. by means of pins 24, to shaft 19 as to corotate therewith and are adapted to mesh with stationary toothed racks 25. Shaft 19 is biassed axially by springing 26 which keeps the gears 23 disengaged from the racks 25 and maintains the pins 20 engaged in grooves 21 in worm 18.

A hand wheel 28 which can be disposed e.g. on a side member 29 of frame 3 is adapted to rotate shaft 19 by way of a flexible transmission element 30 such as a flexible shaft or a Bowden cable or the like, the element 30 being received in an outer sheath 31. When shaft 19 is rotated through the agency of wheel 18 and transmission element 30, pin 14 moves axially to vary the extent of pivoting-out of the moulding 4 in its function as a plate providing lumbar support for the sitter.

When the hand wheel 28 is pulled out axially, shaft 19 is moved to the left—as considered in the plane of the illustration in FIG. 2—, by way of element 30, the gears 23 meshing with the racks 25 and the pins 20 disengaging from the grooves 21 or the like. When the pulled-out hand wheel 28 is turned, the entire adjusting mechanism 13-18 for the spring 5 and moulding or plate 4 is moved vertically up or down along slot 12. This adjustment does not alter the pivoted position of spring 5. Upon the completion of vertical adjustment the hand wheel 28 is pressed back so that shaft 19 is pivoted to the right, as considered in the plane of the drawing, by spring 26. When the shaft 19 is rotated by the wheel 28, the pin 20 can reengage in the associated groove 21, with the result that rotation of wheel 28 now adjusts spring 5 with moulding 4, shaft 19 being guided into a longitudinal slot 32.

The shaft 19 can be moved axially by mechanical means. To this end, a lever 33 can be provided which is connected to an eccentric collar 34 rigidly attached to a cam 35. The same has a ramp-like surface 36 ensuring that when lever 33 is rotated around the axis of transmission element 30, wheel 28 can be moved so far out that displacement of shaft 19 brings gears 23 into engagement with rack 25. When lever 33 is turned back, spring 26 moves shaft 19 in the opposite direction. The coupling element 37 and a bearing support 38 are provided.

A very important consideration in the manipulation of the adjusting mechanism and in checking the position of the moulding 4 is to be able to check the position into which the same has been adjusted. It is important, both for individual adjustment of the adjusting mechanism and also for the case in which the position of the lumbar support on a single seat must be altered, as when the vehicle is driven by different drivers, that the position of the lumbar support or moulding 4 can be indicated on a scale, so that the setting of the lumbar support can be known and its normal position restored after an interim adjustment; the point is that the position of the moulding 4 depends upon the type of spine which the sitter has, e.g. whether his spine is of the lordosis or kyphosis type.

A corresponding indication can be provided by an indicating device 40 which can be coupled directly or indirectly with the collar 13. The device 40 has a scale plate 41 and a pointer 42. Advantageously, the scale plate 41 corotates with the rotatable collar 13, e.g. through the agency of a double-facet member 43 or a multifacet member, while the pin 14, which is stationary in the collar 13, has a pointer 42; the scale plate 41 can have a scale division on its surface 41a. The pointer 42 corotates with the pin 14; for instance, the pointer 42 can have a shank or stem 42a which is of non-round cross-section and which is engaged in a matching recess 14a in pin 14, the pointer 42 being adapted to move axially, for because the pin 14 is prevented from rotating by the engagement of spring 5 in fork 14b, the pin 14 moves axially upon rotation of collar 13, so that the pivoting-out of the moulding 4 varies. The scale plate 41 can, if required, be disposed on the non-rotatable pin 14 and the pointer 42 connected to the rotatable collar 13. As the scale plate 41 rotates, the pointer 42 indicates on the scale the extent of adjustment of moulding 4.

FIGS. 5 and 6 show a modification to the extent that the scale plate 41 engages by way of clips 44 with tooth systems 45 on collar 13, so that the same can be turned by means of plate 41 for manual adjustment, remote adjustment by the shaft 19 being omitted. Spring strips 16 can so engage by its own resilience with frame 3 that the vertical adjustment of the disc 11 is maintained solely by friction. Advantageously, spring strip 16 is mounted in an annular groove 11a in disc 11 and can be engaged in groove 11 by a bayonet connection.

The indicating device 41, 42 shown in FIG. 7 is disposed at the free end of shaft 19; thanks to the provision of a flexible shaft 47 the device 41, 42 can be disposed away from the adjusting mechanism, e.g. on the facia board of a motor vehicle or the like. In this event the scale plate 41 corotates with a mounting 48 which can be screwed to frame 3 whereas the pointer 42 is connected by a coupling 47 to the rotatable shaft 19. When to adjust the height of the complete adjustment mechanism the shaft 19 is moved axially, as indicated by an arrow, to engage gear 23 with rack 25, the opposite ends of shaft 19 and member 47 disengage from one another automatically so that the indicating device does not operate during height adjustment of the complete mechanism, operating only upon adjustment of the moulding 4.

FIGS. 8 to 10 show another embodiment 40a of the indicating device wherein the pointer 50 is a fork; a slider 52 serving as pointer is disposed in a slot 51 formed by the fork. Slider 52 engages with a spiral guide member 53 of a scale plate 54, for instance, by a pin 52a engaging in a guide 53 embodied as a spiral groove. When scale plate 54 rotates, the slider 52 slides vertically in the radial direction as indicator, so that the radial position of the slider 52 can indicate the deflection of the moulding 4 on a scale. The guide 53 can be instead of a spiral groove a spiral rib engaged around by a fork-like pin of the slider 52.

I claim:
1. A mechanism for adjusting a lumbar support of a back of a seat or armchair or the like, more particularly office seats, motor vehicle seats or the like;
 (a) frame means in said seat back, said frame means having an elongated guide means extending in the longitudinal direction of said seat back;
 (b) support means mounted on said guide means for movement therealong in said longitudinal direction;
 (c) elongated means pivotally mounted at one end of said support means for movement in a plane transverse to the plane of said seat back;

(d) a plate-like moulding mounted on the end of said elongated means opposite said one end thereof;
(e) means mounted on said support means and connected to said elongated means to control the pivotal position of said elongated means;
(f) a shaft;
(g) means mounting said shaft on said support means, with its axis extending substantially in the plane of said seat back and transverse to said longitudinal direction of said seat back, for axial movement between first and second positions and for rotational movement;
(h) at least one elongated toothed rack mounted in said seat back and extending in said longitudinal direction of said seat back;
(i) first transmission means for coupling said shaft, when in said first axial position, to said control means such that rotation of said shaft pivots said elongated means to move said plate-like moulding along a path transverse to said plane of said seat back; and
(j) second transmission means for coupling said shaft, when in said second axial position, to said at least one toothed rack such that rotation of said shaft moves said support means along said guide means to move said plate-like moulding along a path in said longitudinal direction of said seat back;
(k) whereby said plate-like moulding may be adjusted by said shaft along both planes transverse to and substantially parallel to said longitudinal direction of said seat back.

2. A mechanism according to claim 1 wherein said elongated guide means of said frame means is a longitudinal slot in said frame means, said frame means defining opposed longitudinal edges of said slot, and said support means extends between and engages said longitudinal edges.

3. A mechanism according to claim 1 wherein said elongated means comprises an elongated spring member.

4. A mechanism according to claim 1 wherein said plate-like moulding is pivotally mounted on the end of said elongated means opposite said one end thereof.

5. A mechanism according to claim 4 wherein said plate-like moulding includes a plurality of pivot means spaced from each other, any one of which pivot means may be connected to said end of said elongated means opposite said one end thereof to adjust the position of said plate-like moulding relative to said elongated means.

6. A mechanism according to claim 1 wherein said control means comprises a tapped collar rotatably mounted in said support means and a screw-threaded pin meshing with said tapped collar and engaging said elongated means and said first transmission means comprises a worm wheel secured to said tapped collar, a worm gear freely mounted on said shaft and meshing with said worm wheel, said worm gear having at least one slot therein, and at least one pin extending transversely from said shaft for engaging said at least one slot in said worm gear.

7. A mechanism according to claim 6 wherein said screw-threaded pin engages said elongated means at a position spaced from the pivotal axis of said elongated means.

8. A mechanism according to claim 1 wherein said second transmission means comprises at least one gear secured to said shaft for engaging said at least one toothed rack.

9. A mechanism according to claim 1 further comprising cam means for axially moving said shaft between said first and second positions and spring means for biasing said shaft in one axial direction.

10. A mechanism according to claim 1 further comprising a hand wheel mounted on said seat back and flexible transmission means extending between said hand wheel and one end of said shaft for manually rotating said shaft.

11. A mechanism according to claim 1 further comprising means for indicating the position of said moulding in said seat back.

12. A mechanism according to claim 11 wherein said indicating means comprises a scale plate connected to said tapped collar for co-rotation therewith and a pointer stationarily mounted on said screw-threaded pin.

13. A mechanism according to claim 12 wherein said pointer is axially movable with said pin.

14. A mechanism according to claim 11 wherein said indicating means comprises a scale plate mounted on said seat back, a rotatable pointer associated with said scale plate and means connecting said pointer to said shaft.

15. A mechanism according to claim 14 wherein said connecting means comprises a flexible shaft.

16. A mechanism according to claim 11 wherein said indicating means comprises a scale plate, sprial guide means, a pivotally mounted forked member, pointer means slidably mounted on said forked member and engaging said spiral guide means, and means connecting said pivotally mounted forked member to said shaft.

* * * * *